Patented June 21, 1932

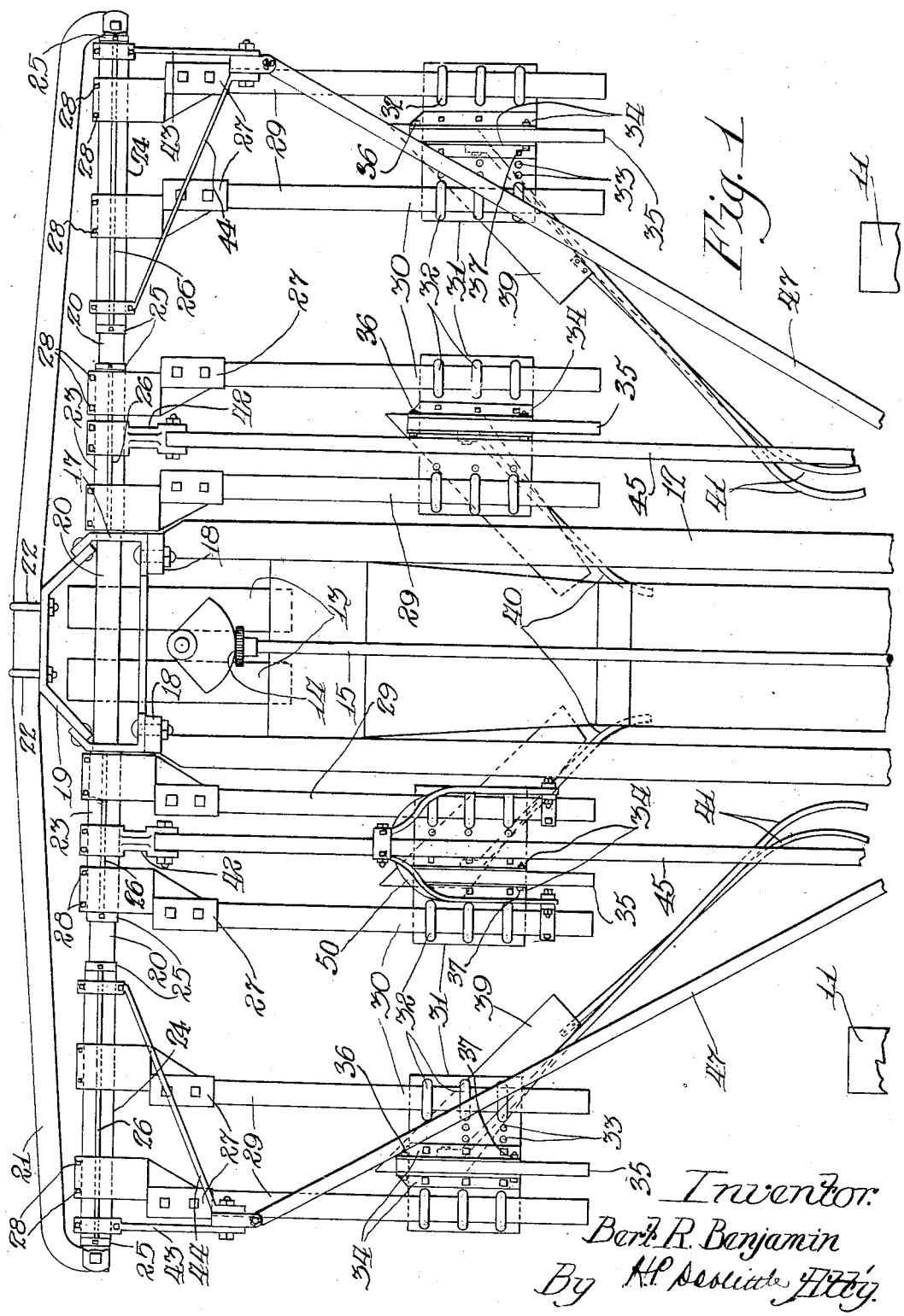

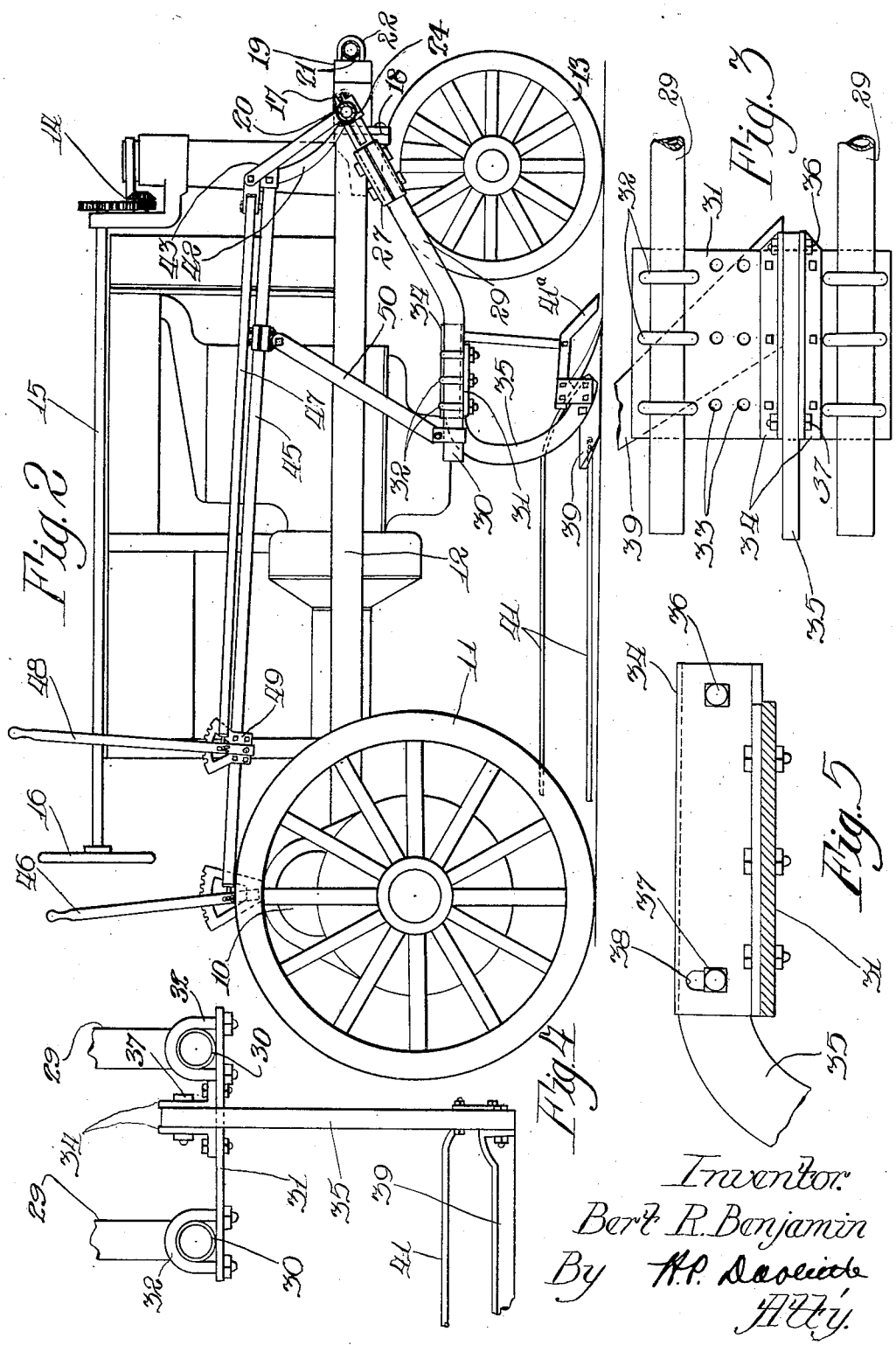

1,864,291

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTOR-HARVESTER

Application filed February 7, 1930. Serial No. 426,508.

The present invention relates to apparatus for gathering or harvesting row-grown crops, and more particularly to a harvesting attachment for tractors.

The primary object of the invention is to provide a simple and efficient attachment for tractors of standard types, which, when in position on the tractor, will constitute therewith a self-propelled harvester or windrower for row grown crops such as beans, peas, etc. capable of operating on at least two, and preferably four, plant rows at each traverse of the field.

Other objects are to provide an arrangement of harvesting or cutting units and plant conveying or deflecting elements which will operate to deliver the severed crop from the several rows to a single longitudinal line or windrow, and to provide a structure and arrangement of parts particularly adapted for use in connection with row crop tractors of the type having widely spaced rear traction wheels adapted to span two plant rows at conventional spacings and having a central front steering truck traveling between the rows spanned by the rear wheels.

Other objects and advantages will become apparent from the description of the preferred structural embodiment of the invention hereinafter given and illustrated in the accompanying drawings, where:

Figure 1 is a plan view of the tractor-harvester combination embodying the invention;

Figure 2 is a side elevation of the same;

Figure 3 is an enlarged detail plan view of the supporting means for the cutting units;

Figure 4 shows the same structure as Figure 3 viewed from the rear; and,

Figure 5 is an enlarged detail view of a mounting for the standard of a cutting blade.

In the present instance the invention is disclosed as including a harvesting attachment mounted on a row crop tractor of a well known type and having the general structure shown, for instance in the patent to Anthony 1,613,865 of January 1, 1927. Tractors of the type referred to and herein illustrated comprise an extended rear axle structure 10 supported at the ends on traction wheels 11 and a central forwardly extending body 12 supported at the front by a central steering truck 13. The body 12 carries the usual power plant, clutch, transmission housing, etc. The steering truck preferably comprises a vertical standard swiveled in a front casting or crosshead ahead of the radiator of the tractor and connected at its upper end by suitable gearing at 14 to a steering rod 15, which is actuated from a steering wheel 16 adjacent the operator's station on the rear of the tractor.

The harvesting attachment is preferably carried on the forward portion of the tractor, and, in this instance, is shown as consisting of a horizontal, forwardly extending, U-shaped frame 17 bolted to each forward end of the tractor body through supporting plates and brackets at 18. The forwardly extending arms of the frame 17 support a forwardly arched bar 19, the ends of which are bolted or otherwise attached to the arms of the frame 17. The arms of the frame 17 are apertured to receive an extended cross bar 20, the opposite ends of which extend laterally beyond each side of the tractor, as shown in Figure 1. This bar is preferably cylindrical and may consist of a hollow pipe. The ends of the cross bar 20 are braced by a truss member 21, the middle portion of which is secured by U-bolts 22 to the forwardly extending member 19. This construction provides a rigid, transversely extending draft frame comprising a cross-bar extending outwardly at each side of the tractor to points beyond the tread lines of the rear traction wheels and spanning four plant rows. In this preferred construction the cross bar 20 is mounted on the tractor forwardly of the axis of the wheels of the steering truck. Each extended end of the cross bar 20 has journaled on it an inner sleeve 23 and an outer sleeve 24 held in position by set collars 25 at either end of the sleeves. Each sleeve is preferably formed with a spline 26 cooperating with grooves in a pair of split clamp brackets 27 which embrace the respective sleeves and are adjustably clamped thereon for lateral adjustment as by bolts 28. Each pair of brackets carried by the respective sleeves has connected thereto a pair of parallel drag beams 29 extending rearwardly and terminating in substantially horizontal rear portions 30. The horizontal rear portions of each pair of beams are rigidly connected by transverse members such as plates 31 secured by U-bolts 32 to the respective drag beams, which plates 31 have means for securing the standard of a cutting element thereto in an adjustable manner. This is preferably accomplished by providing each plate with a plurality of rows of transversely and longitudinally aligned apertures 33 registering with corresponding apertures in a pair of spaced angle members 34 positioned on the upper face of the plate 31 and between the upstanding flanges of which there is received a substantially straight horizontal upper end portion of a curved standard 35. As shown in Figure 5, the straight portion of the standard received between the angle members 34 is pivoted at its forward end to the forward ends of the angle members 34 by a bolt 36 and is further connected to the rear ends of the angle members by a bolt 37 passing through arcuate slots 38 in the angle members to permit a certain degree of angular vertical adjustment for the standard 35. Each standard 35 carries a cutting blade 39, the forward cutting edges of which are arranged on parallel lines converging rearwardly towards the central longitudinal median line of the tractor. In connection with each blade the standards carry deflecting rods extending in the same general direction as the blades and acting as means for conveying the cut plants towards a line in the path of the wheels of the steering truck. The blades and standards comprising the inner plant cutting units are equipped with comparatively short, deflecting rods 40 while the outer units have longer deflecting rods or conveying bars 41, which are extended back of the inner units, as illustrated by Figure 1. Each cutting unit may also comprise a stalk lifting finger 41a (Fig. 2) projected in advance of each blade.

As means for oscillating the sleeves 23 and 24 at each side of the machine for the purpose of raising and lowering the drag beams and cutting units, the sleeves 23 are provided with a rigid crank arm 42 and the sleeves 24 at their outer ends, with a similar crank arm 43, which, in the case of the outer sleeves 24, may be braced by a bar 44 extending from the end of the crank arm to the inner end of each of these sleeves. The crank arms 42 on the inner sleeves 23 are pivotally connected to rearwardly extending lifting rods 45 connected at their rear ends to hand levers 46 supported for adjustment on the rear axle structure of the tractor. The outer crank arms 43 are pivoted to similar lifting rods 47 connected at their rear ends to hand levers 48 mounted on sector brackets 49 which are secured to the rear portions of the lifting rods 45, as best shown in Figure 2. Jockey arches 50 connect the rear ends of each pair of drag beams to an intermediate point on the respective lifting rods, as illustrated, in connection with one pair of beams only, in Figures 1 and 2.

With the construction described and illustrated, it will be evident that the respective plant cutting units may be adjusted laterally into accurate alignment with the plant rows to be operated upon and that the plants severed by the respective units will be directed inwardly towards the center line of the tractor with the plants from both the inner and outer units deposited in a single central windrow. It will be evident that manipulation of one of the levers 46 will serve to raise and lower the units at one side of the tractor simultaneously through oscillation of the sleeves 23 and 24 and that rotary adjustment of the outer sleeves 24 with respect to the adjacent sleeve 23 may be effected through manipulation of the levers 48.

There has accordingly been provided a simple apparatus capable of easy adjustment and control, which in combination with a row-crop tractor constitutes a four-row harvester for crops grown in rows and which will deposit such crops in a single continuous windrow under the tractor body, from which windrow the crop can then thereafter be picked up and loaded with facility. It is also to be noted that the forward position of the harvesting units on the tractor permits these to be viewed from the operator's station and easily guided along the plant rows and that the steering truck also serves to gauge or maintain the cutting blades at even cutting level.

The preferred embodiment disclosed is subject to modification within the scope of the invention as defined by the following claims.

What is claimed is:

1. In a row crop harvester, the combination with a vehicle of a plurality of plant cutting units carried on said vehicle and spaced transversely thereof to operate on plant rows along which the vehicle moves, said cutting units consisting of two inner units adapted to operate on adjacent plant rows and including means for delivering plants cut thereby in a windrow between said units, outer units adapted to operate on rows next beyond each inner unit, and plant conveying means on the outer units extending on lines converging rearwardly of the respective inner units and delivering plants cut by the outer units in the same windrow as the inner units.

2. In a row crop harvester, the combination with a tractor having wide spaced rear traction wheels adapted to span two plant rows and a central front steering truck adapted to travel between said rows, of a plurality of plant cutting units carried by the tractor and positioned ahead of the traction wheels and back of the steering truck in transversely spaced relation corresponding to the plant rows along which the tractor moves, said cutting units consisting of two inner units adapted to operate on the adjacent plant rows spanned by the traction wheels and including means for delivering plants cut thereby in a windrow between said rows. outer units adapted to operate on the rows next beyond the traction wheels, and plant conveying means on the outer units extending on lines converging rearwardly of the respective inner units and delivering plants cut by the outer units in the same windrow as the inner units.

3. The combination with a tractor having wide spaced rear traction wheels adapted to span two plant rows and a central front steering truck adapted to travel between said rows, of a crossbar secured to the front end of the tractor with its ends extending beyond each side of the truck, a pair of parallel drag beams pivoted on each extended end of the crossbar and trailing therefrom at each side of the truck and within the tread lines of the traction wheels, each pair of beams being positioned to straddle a plant row along which the tractor moves, plant cutting means adjustably mounted between each pair of drag beams, and means also carried by the beams for directing plants cut by the respective cutting means towards a central longitudinal line beneath the tractor.

4. The combination with a tractor having wide spaced rear traction wheels adapted to span two plant rows and a central front steering truck adapted to travel between said rows, of a crossbar secured to the front end of the tractor ahead of the vertical axis of the steering truck with its ends extending laterally to points beyond the tread lines of the traction wheels, two plant cutting units supported on each extended end of the crossbar and located in row engaging positions at each side of the tread lines of the respective traction wheels, and means in connection with each cutting unit for conveying severed plants on rearwardly converging lines to a common windrow formed in the path of the steering truck.

5. The combination with a tractor, of a crossbar secured on the tractor with its ends extending beyond each side thereof, a sleeve journaled on each of the extended ends of said bar, a pair of parallel drag beams having forward ends clamped on each sleeve, transverse members connecting each pair of drag beams at the rear ends thereof, a standard adjustably secured to each member between the beams, a plant cutting blade secured to each standard, means carried by each standard for directing cut plants towards a central longitudinal line beneath the tractor, and means on the tractor for oscillating said sleeves to raise and lower the drag beams.

6. The combination with a tractor, of a crossbar secured on the tractor with its ends extending beyond each side thereof, inner and outer elongated sleeves journaled on each of the extended ends of the bar, a pair of parallel drag beams having forward ends clamped on each sleeve for axial adjustment therealong, transverse members rigidly connecting the rear ends of each pair of drag beams, a standard adjustably secured to each transverse member between the beams for lateral adjustment thereon, a plant cutting blade secured to each standard lifting means for oscillating the sleeves on the respective extended ends of the crossbar in unison to raise and lower the drag beams carried thereby, and means included in said lifting means for optionally oscillating one sleeve with respect to another.

7. A plant cutting unit for bean harvesters and the like, comprising a support, parallel drag beams depending therefrom and terminating in substantially horizontal portions, a plate member rigidly connecting the horizontal portions of the drag beams, a curved standard formed with a substantially straight horizontal upper portion pivotally connected to said plate member on a transverse axis, means for connecting said portion of the standard to the plate at a plurality of lateral adjustments, and a cutting blade carried by the lower end of the standard beneath said plate.

In testimony whereof, I affix my signature.

BERT R. BENJAMIN.